3,373,205
STABILIZED COMPOSITION OF AROMATIC DIAMINES

Duncan J. Crowley, deceased, late of Penns Grove, N.J., by Helen T. Crowley, executrix, Penns Grove, N.J., assignor to E. I. du Pont de Nemours and Company
No Drawing. Filed May 27, 1965, Ser. No. 459,469
5 Claims. (Cl. 260—578)

This invention is directed to the stabilization of molten m-phenylenediamine and 2,4-toluylenediamine against degradation and discoloration caused by exposure of these amines to normal atmospheric conditions.

Meta-phenylenediamine and 2,4-toluylenediamine are widely used intermediates for dyes and other chemicals. When freshly prepared, they are white or almost white substances which discolor rapidly upon standing. Meta-phenylenediamine and 2,4-toluylenediamine are normally solids, M.P. 63° C. and 97.5° C., respectively. However, for convenience, it is often expedient to store, ship and handle these amines in the molten state.

Both aromatic amines, particularly m-phenylenediamine, are subject to deterioration and discoloration on exposure to normal atmospheric conditions. This deterioration and discoloration problem is magnified by the fact that discoloration is accelerated when the amines are maintained in the molten state at elevated temperatures. The presence of this discoloration in the amines limits their usefulness as intermediates, since the discoloration must be either removed by distillation prior to use, which causes a loss of amine, or tolerated in the final product.

It is, therefore, an object of this invention to provide a novel composition of stabilized molten m-phenylenediamine or 2,4-toluylenediamine.

It is another object of this invention to provide a novel process for stabilizing molten m-phenylenediamine or 2,4-toluylenediamine.

These and other objects will become apparent from the following description and claims.

More specifically, the present invention is directed to a novel stabilized composition comprising an amine such as m-phenylenediamine or 2,4-toluylenediamine and from about 0.001 to 0.5% by weight of the amine of a thiol ester selected from the group consisting of diphenyl dithiolisophthalate, dibenzyl dithiolisophthalate, di-n-amyl dithiolisophthalate and benzyl thiolbutyrate.

The present invention is also directed to a process for stabilizing m-phenylenediamine or 2,4-toluylenediamine which comprises incorporating therein from about 0.001 to 0.5% by weight of the amine of one of the hereinbefore described thiol esters.

It has been unexpectedly found that only certain thiol esters are effective stabilizers for m-phenylenediamine and 2,4-toluylenediamine. Diphenyl dithiolisophthalate and dibenzyl dithiolisophthalate are extremely effective and, therefore, the preferred thiol esters of this invention. The ability of thiol esters to stabilize amines such as m-phenylenediamine varies to such a degree that it is impossible to predict this characteristic from one ester to another. For example, some aliphatic dithiolisophthalates and aryl thiolaliphatic acid esters are found to be satisfactory stabilizers for m-phenylenediamine, while others are completely ineffective. As illustrative of this unpredictability, various thiol ester additives and their effectiveness in stabilizing molten m-phenylenediamine are set forth below in Table I.

TABLE I.— THIOL ESTERS TESTED AS COLOR STABILIZERS (0.1 WT. PERCENT) FOR MOLTEN M-PHENYLENEDIAMINE AT 75° C. UNDER NITROGEN BLANKET

| Additive | | Effectiveness |
|---|---|---|
| Name | Formula | |
| Diphenyl dithiolisophthalate | $C_6H_5SCOC_6H_4COSC_6H_5$ | Very good. |
| Dibenzyl dithiolisophthalate | $C_6H_5CH_2SCOC_6H_4COSCH_2C_6H_5$ | Do. |
| Di-n-amyl dithiolisophthalate | $C_5H_{11}SCOC_6H_4COSC_5H_{11}$ | Good. |
| Benzyl thiolbutyrate | $C_6H_5CH_2SCOC_3H_7$ | Do. |
| Dibenzyl dithiolterephthalate | $C_6H_5CH_2SCOC_6H_4COSCH_2C_6H_5$ | No good. |
| Ethyl thiolbenzoate | $C_2H_5SCOC_6H_5$ | Do. |
| n-Butyl thiolbenzoate | $n-C_4H_9SCOC_6H_5$ | Do. |
| Dimethyl dithiolisophthalate | $CH_3SCOC_6H_4COSCH_3$ | Do. |
| Di-t-butyl dithiolisophthalate | $t-C_4H_9SCOC_6H_4COSt-C_4H_9$ | Do. |
| Di-t-dodecyl dithiolisophthalate | $t-C_{12}H_{25}SCOC_6H_4COSt-C_{12}H_{25}$ | Do. |

The effectiveness of the esters in stabilizing m-phenylenediamine as set forth above was tested by the following procedure. Meta-phenylenediamine containing less than 0.1 wt. percent isomers, melting range of 62.7° C. to 63.0° C., was distilled under $N_2$ into a receiver containing a weighed amount of stabilizer. The distillation was carried out at a temperature of 146° C. to 148° C. and at a pressure of 10 mm. of mercury. While maintaining a nitrogen blanket over the surface of the molten m-phenylenediamine, the receiver was removed from the vacuum line after distillation was complete and sealed with a ground-glass stopper.

The receiver containing the m-phenylenediamine and stabilizer was maintained at 80±1° C. (oil bath) and checked daily for visual color change. Stabilizers which kept m-phenylenediamine essentially unchanged in color for 30 days were rated effective. With ineffective stabilizers the m-phenylene diamine color changed from water-white to yellow to amber to brown to red to purplish black. In these cases, the test receivers were removed from the bath, the m-phenylenediamine solidified, and a 2% solution in a suitable solvent, such as methanol, was analyzed optically at 400 millimicrons wavelength. An optical density 0.037, corresponding to a dark amber or pale brown color, is taken as the maximum permissible color formation during a 30-day storage period at 80° C.

In order to obtain optimum stability of the amine, it is generally preferred to add the thiol ester to the m-phenylenediamine or 2,4-toluylenediamine as soon as they are prepared, particularly immediately after distillation. If the amine is distilled, minimum contact thereof with atmospheric conditions and maximum stabilization are obtained when the amine is distilled under nitrogen into a receiver containing an effective amount of the thiol ester. However, the application of the present invention is not restricted to freshly prepared amines, as the thiol esters will effectively stabilize partially distilled amines against further discoloration. Also, the thiol esters may be added during the manufacture of the amine to avoid discoloration during manufacture thereby obtaining the amine in higher yields and better quality.

The thiol esters of this invention are best incorporated into m-phenylenediamine or 2,4-toluylenediamine by simply adding the esters to the molten amine with appropriate means to provide uniform distribution. If the amine is a solid, it may be melted or dissolved in an inert liquid solvent and the thiol ester added to the melted amine or to the solution. Also, if the thiol ester is not soluble in the amine to the extent desired, it may be added as a solution in a suitable inert liquid solvent.

Representative examples illustrating the stabilizing effectiveness of the thiol esters of this invention on m-phenylenediamine and 2,4-toluylenediamine are as follows.

In the following examples, testing of the stability of the molten amines was conducted at about 5° C. to 20° C. above the melting point of the amine, e.g., about 70° C. to 85° C. for m-phenylenediamine and about 100° C. to 105° C. for 2,4-toluylene diamine. It is not necessary to maintain the molten amine at an excessively high temperature, since it is sufficient for purposes of shipping and handling to maintain the amine in the molten state just slightly above its melting point.

*Example 1*

Fifty grams of high-purity m-phenylenediamine, collected as described in the test procedure and containing 0.1 wt. percent diphenyl dithiolisophthalate uniformly distributed therein, were maintained at 80±1° C. and visually checked daily for color change. After two months' storage time, the sample was removed from the bath with essentially no color change.

*Example 2*

Fifty grams of high-purity m-phenylenediamine, containing 0.01 wt. percent of diphenyl dithiolisophthalate, changed in color from off-white to yellow in 30 days' storage at 80° C. The optical density of 0.02 at 400 millimicrons is well below the maximum permissible color formation during the 30-day storage period.

The base stock of freshly distilled m-phenylenediamine, from which the above 50 g. sample was taken, was maintained under a nitrogen blanket at 80° C. The base stock sample exceeded the maximum permissible color formation after 3 days' storage. The maximum permissible color formation was exceeded in only 1 day when an air blanket was used.

A sample of freshly distilled m-phenylenediamine containing 0.10 wt. percent diphenyl dithiolisophthalate under an air blanket exceeded the maximum permissible color formation in about 10 days.

*Example 3*

In a manner similar to that described in Example 1, freshly distilled high-quality m-phenylenediamine was stabilized with 0.1 wt. percent dibenzyl dithiolisophthalate, di-n-amyl dithiolisophthalate and benzyl thiolbutyrate and held under a nitrogen blanket at 75° C. for 30 days. Essentially no color formation was observed during this period with any of these stabilizers.

*Example 4*

A sample of 2,4-toluylenediamine which had a melting range of 96.8° C. to 97.3° C. was distilled at 141° C. to 142° C. at a pressure of about 3 mm. of mercury to obtain an off-white distillate. The distillate was tested at 0.02 wt. percent and 0.2 wt. percent levels with dibenzyl dithiolisophthalate under a nitrogen blanket. During the course of 29 days' storage in an oven at about 100° C., the color changed from water-white to pale amber. A control sample under nitrogen blanket containing no additive turned black by the second day.

When three samples of 2,4-toluylenediamine were each stabilized with 0.2 wt. percent of diphenyl dithiolisophthalate, di-n-amyl dithiolisophthalate and benzyl thiolbutyrate, respectively, similar results to that above were obtained.

The effective concentration of stabilizer in the aromatic amines of this invention is from about 0.001 to 0.5 wt. percent of the amine. The preferred concentration is about 0.001 to 0.2 wt. percent.

The thiol esters utilized in this invention may be conveniently prepared by reacting the appropriate acid halide with the mercaptan according to known procedures, e.g., as described by F. W. Wenzel, Jr. and E. E. Reid in J. Am. Chem. Soc., 59, 1089 (1933). For example, benzyl mercaptan, dissolved in a mixture of ethyl ether and piperidine, was added dropwise to isophthaloyl chloride, also dissolved in ethyl ether, at 10° C. The mixture was held at 10° C. for one hour. The reaction mixture was thereafter allowed to rise to room temperature at which point chloroform was added. The product, dibenzyl dithiolisophthalate, was isolated from the reaction mixture.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A stabilized composition consisting essentially of an aromatic amine selected from the group consisting of m-phenylenediamine and 2,4-toluylenediamine and from about 0.001 to 0.5% by weight of said amine of a thiol ester selected from the group consisting of diphenyl dithiolisophthalate, dibenzyl dithiolisophthalate, di-n-amyl dithiolisophthalate and benzyl thiolbutyrate.

2. A stabilized composition consisting essentially of m-phenylenediamine and from about 0.001 to 0.5% by weight of said m-phenylenediamine of diphenyl dithiolisophthalate.

3. A stabilized composition consisting essentially of m-phenylenediamine and from about 0.001 to 0.5% by weight of said m-phenylenediamine of dibenzyl dithiolisophthalate.

4. A stabilized composition consisting essentially of 2,4-toluylenediamine and from about 0.001 to 0.5% by weight of said 2,4-toluylenediamine of dibenzyl dithiolisophthalate.

5. A process for stabilizing an aromatic amine selected from the group consisting of m-phenylenediamine and 2,4-toluylenediamine which comprises incorporating in said amine from about 0.001 to 0.5% by weight of said amine of a thiol ester selected from the group consisting of diphenyl dithiolisophthalate, dibenzyl dithiolisophthalate, di-n-amyl dithiolisophthalate and benzyl thiolbutyrate.

References Cited

UNITED STATES PATENTS 2,664,445  12/1953  Linch _____ 260—578 X
3,068,289  12/1962  Woodbridge _____ 260—578

CHARLES B. PARKER, *Primary Examiner.*

PATRICIA C. IVES, *Assistant Examiner.*